US009260601B2

(12) United States Patent
McDaniel et al.

(10) Patent No.: US 9,260,601 B2
(45) Date of Patent: *Feb. 16, 2016

(54) SINGLE DRUM OIL AND AQUEOUS PRODUCTS AND METHODS OF USE

(71) Applicant: General Electric Company, Schenectady, NY (US)

(72) Inventors: Cato Russell McDaniel, The Woodlands, TX (US); Kurt Jason Ginsel, The Woodlands, TX (US); Karl Douglas Kuklenz, The Woodlands, TX (US)

(73) Assignee: General Electric Company, Schenectady, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 13/627,685

(22) Filed: Sep. 26, 2012

(65) Prior Publication Data

US 2014/0083909 A1 Mar. 27, 2014

(51) Int. Cl.
  *C08L 61/14* (2006.01)
  *C10G 33/04* (2006.01)
  *B01D 17/04* (2006.01)

(52) U.S. Cl.
  CPC ............... *C08L 61/14* (2013.01); *B01D 17/047* (2013.01); *C10G 33/04* (2013.01); *C10G 2300/1033* (2013.01)

(58) Field of Classification Search
  CPC ........... C10G 33/04; C10G 2300/1033; B01D 17/04; B01D 17/047; C08K 3/16; C08K 5/06; C08L 43/00; C08L 61/06; C08L 61/14; C09K 3/00
  USPC ........ 516/21, 28, 29, 183, 164, 165; 208/188; 524/377, 437
  See application file for complete search history.

(56) References Cited

U.S. PATENT DOCUMENTS

| 1,617,739 | A | | 2/1927 | Averill | |
|---|---|---|---|---|---|
| 2,233,383 | A | | 2/1941 | De Groote et al. | |
| 2,454,545 | A | * | 11/1948 | Bock et al. | 516/183 |
| 2,499,365 | A | | 3/1950 | De Groote et al. | |
| 2,615,853 | A | | 10/1952 | Kirkpatrick et al. | |
| 2,754,271 | A | | 7/1956 | Kirkpatrick | |
| 3,497,006 | A | * | 2/1970 | Jones et al. | 166/270.1 |
| 3,506,070 | A | * | 4/1970 | Jones | 507/259 |
| 3,708,522 | A | | 1/1973 | LeSuer | |
| 3,740,421 | A | | 6/1973 | Schmolka | |
| 3,928,194 | A | | 12/1975 | Tao | |
| 3,977,472 | A | | 8/1976 | Graham et al. | |
| 4,032,514 | A | | 6/1977 | Buriks et al. | |
| 4,058,453 | A | | 11/1977 | Patel et al. | |
| 4,209,422 | A | | 6/1980 | Zimmerman et al. | |
| 4,321,146 | A | | 3/1982 | McCoy et al. | |
| 4,321,147 | A | | 3/1982 | McCoy et al. | |
| 4,326,968 | A | * | 4/1982 | Blair, Jr. | 516/182 |
| 4,342,657 | A | * | 8/1982 | Blair, Jr. | 516/182 |
| 4,446,054 | A | * | 5/1984 | Bessler | 516/161 |
| 4,737,265 | A | | 4/1988 | Merchant, Jr. et al. | |
| 4,800,039 | A | | 1/1989 | Hassick et al. | |
| 4,842,067 | A | * | 6/1989 | Balzer | 507/213 |
| 4,936,867 | A | | 6/1990 | Guttierrez et al. | |
| 5,032,285 | A | | 7/1991 | Braden et al. | |
| 5,120,428 | A | | 6/1992 | Ikura et al. | |
| 5,256,305 | A | | 10/1993 | Hart | |
| 5,282,959 | A | * | 2/1994 | Roling et al. | 208/251 R |
| 5,593,572 | A | | 1/1997 | Hart | |
| 5,607,574 | A | | 3/1997 | Hart | |
| 5,611,869 | A | | 3/1997 | Hart | |
| 5,681,451 | A | | 10/1997 | Hart | |
| 5,693,257 | A | | 12/1997 | Hart | |
| 5,759,409 | A | | 6/1998 | Knauf et al. | |
| 5,921,912 | A | | 7/1999 | Hart et al. | |
| 5,976,357 | A | * | 11/1999 | Strom et al. | 208/184 |
| 6,103,100 | A | * | 8/2000 | Hart | 208/47 |
| 6,106,701 | A | | 8/2000 | Hart | |
| 6,228,239 | B1 | | 5/2001 | Manalastas et al. | |
| 6,294,093 | B1 | | 9/2001 | Selvarajan et al. | |
| 7,160,470 | B2 | * | 1/2007 | Davis et al. | 210/708 |
| 7,285,519 | B2 | | 10/2007 | Cox et al. | |
| 7,771,588 | B2 | | 8/2010 | Engel et al. | |
| 8,168,062 | B2 | | 5/2012 | McDaniel et al. | |

(Continued)

FOREIGN PATENT DOCUMENTS

| CA | 2168392 | 7/1997 |
|---|---|---|
| CN | 1431276 A | 7/2003 |

(Continued)

OTHER PUBLICATIONS

Hawley's Condensed Chemical Dictionary, (2007), John Wiley & Sons, Inc. Online @ http://onlinelibrary.wiley.com/book/10.1002/9780470114735/titles headwords=Colloid Chemistry (321), Colloidal Solution (321), Dispersion (471), Emulsion (499), Macromolecule (774-775), Micelle (847), Suspension (1197), downloaded Sep. 26, 2014), pp. 1-5.*
Derwent Abstract, week 201448, London: Derwent Publications Ltd., AN 2011-M93989, Class A18, EP 2377910 A1 & U.S. Pat. No. 8,168,062 B2, (General Electric Co), abstract, pp. 1-4.*
Machine Translation of CN101029252(a)—Sep. 5, 2007 at espacenet, online @ http://worldwide.espacenet.com/publicationDetails/biblio?DB=worldwide.espacenet.com&ll=0&ND=3&adjacent=true&locale=en_EP&FT=D&date=20070905&CC=CN&NR=101029 252A&KC=A (Downloaded Dec. 15, 2015), pp. 1-7 with original publication copy of CN101029252 (A) — Sep. 9, 2007.*
Pluronic F68—Block Copolymer Surfactant, Technical Bulletin, BASF Corporation, 2004.
Pluronic L121—Block Copolymer Surfactant, Technical Bulletin, BASF Corporation, 2004.
Pluronic P84—Block Copolymer Surfactant, Technical Bulletin, BASF Corporation, 2004.
Tetronic 904—Block Copolymer Surfactant, Technical Bulletin, BASF Corporation, 2004.

(Continued)

Primary Examiner — Daniel S Metzmaier
(74) Attorney, Agent, or Firm — Wegman, Hessler & Vanderburg

(57) ABSTRACT

Dual phase compositions for treating a hydrocarbon stream are disclosed, wherein the dual phase compositions are colloidal micellar solutions with an aqueous phase and an oil phase. Methods are also disclosed for reducing emulsions in a hydrocarbon stream by contacting the hydrocarbon stream with a dual phase composition.

40 Claims, No Drawings

(56) References Cited

U.S. PATENT DOCUMENTS

| | | | |
|---|---|---|---|
| 2004/0247561 | A1 | 12/2004 | Seo et al. |
| 2006/0275342 | A1 | 12/2006 | Lindhardt et al. |
| 2007/0034571 | A1 | 2/2007 | Costa et al. |
| 2007/0112079 | A1* | 5/2007 | McDaniel et al. ............ 516/191 |
| 2009/0197978 | A1 | 8/2009 | Patel et al. |
| 2009/0205975 | A1 | 8/2009 | Tanahashi et al. |
| 2010/0078331 | A1 | 4/2010 | Scherson et al. |
| 2011/0011806 | A1 | 1/2011 | Ebert et al. |
| 2011/0031163 | A1 | 2/2011 | Byrne et al. |
| 2012/0172270 | A1 | 7/2012 | Dilsky |
| 2012/0261312 | A1* | 10/2012 | Flores Oropeza et al. .... 208/188 |

FOREIGN PATENT DOCUMENTS

| | | |
|---|---|---|
| CN | 101029252 A | 9/2007 |
| CN | 101463116 A | 6/2009 |
| CN | 101734756 A | 6/2010 |
| EP | 0 222 587 A1 | 5/1987 |
| EP | 0 509 964 A1 | 10/1992 |
| EP | 2252385 B1 | 9/2009 |
| EP | 2 377 910 A1 | 10/2011 |
| WO | WO 00/13762 A1 | 3/2000 |
| WO | WO 2009/097061 A1 | 8/2009 |
| WO | WO 2011/035854 A1 | 3/2011 |

OTHER PUBLICATIONS

Daiyin, Y. et al., "Application of a Testing Equipment with Optical Imaging for Interfacial Tension on Open Experimental Teaching", College of Petroleum Engineering, Northwest Petroleum University, Daqing P.R.China, 4 pages, IEEE, 2010.

Embreak 2W906—Emulsion Breaker—Fact Sheet, GE Power & Water, Water & Process Technologies, Feb. 2011.

Embreak 2W2014—Heavy Crude Oil Emulsion Breaker—Fact Sheet, GE Power & Water, Water & Process Technologies, Sep. 2011.

Embreak 2W2032—Crude Oil Emulsion Breaker—Fact Sheet, GE Power & Water, Water & Process Technologies, Sep. 2011.

"Emulsion Breaking", General Electric, 2 pages, http://www.gewater.com/industries/refining_fuel/refining/emulsion_breaking.jsp, Mar. 2, 2012.

"New Emulsion Breaker Technologies Ideal for Improving Desalter Performance", General Electric, 3 pages, http://www/gewater.com/misc/newsletters/articles/02-2011/emulsion.jsp, Mar. 2, 2012.

Wu et al., "Effect of EO and PO Positions in Nonionic Surfactants On Surfactant Properties and Demulsification Performance", Colloids and Surfaces A: Physicochemical and Engineering Aspects, vol. 252, Issue 1, pp. 79-85, Jan. 3, 2005.

U.S. Appl. No. 61/682,794, "Water in Crude Oil Emulsion Breaking Using Synergistic Blend", filed Aug. 14, 2012.

"Imidazolines, Lakeland Laboratories Limited, 8 pages, Aug. 14, 2011 downloaded from http://www.scribd.com/doc/62265863/Imidazoline".

International Search Report and Written Opinion mailed Dec. 5, 2013 for PCT Application No. PCT/US2013/052019 filed Jul. 25, 2013.

Villamizar, W., et al., "CO2 Corrosion Inhibition by Hydroxyethyl, Anrtinoethyl, and Amidoethyl Imidazolines in Water-Oil Mixtures", J. Solid State Electrochem (2007), vol. 11, pp. 619-629.

Chinese Office Action, with unofficial English Translation, issued in connection with corresponding CN Application No. 201380043238.6 on Oct. 28, 2015.

* cited by examiner

SINGLE DRUM OIL AND AQUEOUS PRODUCTS AND METHODS OF USE

FIELD OF THE INVENTION

The present invention relates to compositions and processes for breaking emulsions in crude oil. More particularly, the compositions and processes may be used to break water-in-oil emulsions at an oilfield or in a desalter in a crude oil refinery.

BACKGROUND OF THE INVENTION

Crude oil is produced from geological formations where it is in intimate contact with brine (salt water). As the oil and brine are produced, their movement through geological formations produces an emulsion of water-in-oil, wherein tiny droplets of water are suspended in a continuous phase of oil. Generally, the amount of water produced from the formation in the oil field ranges from 1-2% and may even be higher than 90%. Refineries operate with much lower water content in the crude oil, generally not exceeding 0.5%.

In oilfield industries, these water-in-oil emulsions are often referred to as primary emulsions. Though less common, oil-in-water emulsions, wherein tiny droplets of oil are suspended in a continuous phase of water, also occur and are often referred to as reverse emulsions. Another type of emulsion is a multiple, or complex, emulsion where tiny droplets are suspended in bigger droplets that are suspended in a continuous phase.

To render the crude oil more suitable for refining, the crude oil is demulsified by separating the primary or reverse emulsions into separate oil and water phases. Generally, the steps in demulsification are flocculation followed by coalescence and, finally, sedimentation. During the flocculation step, the suspended droplets aggregate to form larger droplets. During coalescence, the larger droplets come together to form a large drop. Sedimentation takes advantage of the fact that water is denser than oil. During sedimentation the water and oil phases become stratified into distinct layers as large drops of water fall to the bottom. There are several methods for demulsifying oil field emulsions, including thermal, mechanical, electrical, and chemical methods.

Chemical methods employ the use of chemicals that neutralize the effects of emulsion stabilizing agents and to accelerate the demulsification process by reducing the interfacial tension. These chemicals are often referred to as emulsion "breakers" because they break, or separate the emulsions into the separate oil and water phases. Chemicals used to break water-in-oil emulsions, or primary emulsions, are often referred to as primary emulsion breakers. Primary emulsion breakers are added to the continuous oil phase and are generally oil-soluble, though they may be water-soluble. Likewise, chemicals used to break oil-in-water emulsions, or reverse emulsions, are often referred to as reverse emulsion breakers. Reverse emulsion breakers are generally water-soluble, though they may be oil-soluble, and are added to the continuous water phase. Some of the water is removed from the crude oil by adding surfactant chemicals to demulsify the water and oil at the well or near the point of production. These surfactants are optimized to separate, or "break", the oil and water at relatively low temperatures, common in the oil field.

While the water in the oil is a problem for refiners, it is the dissolved salts which cause the most problems since they can deposit and foul heat transfer surfaces. Calcium chloride and magnesium chloride decompose at operating temperatures of the refinery to produce HCl (hydrochloric acid) which corrodes the distillation towers. To remove the brine and the salts it contains, the crude oil is heated to around 120° C. and mixed with about 5% fresh water by passing the water and oil through a mixing valve and thence to a vessel, such as an oil refinery desalter, where it has a residence time of about 30 minutes to allow the emulsion to break and the oil and water to separate.

Without emulsion breakers, more time is required to separate the phases, limiting the amount of oil the refinery can process. In some cases, for example when a multiple emulsion is present, crude oil applications require both primary and reverse emulsion breakers. As primary emulsion breakers generally are oil soluble and reverse emulsion breakers are generally water soluble, the two types of emulsion breakers do not mix and are added to the crude oil or to the wash water separately.

BRIEF DESCRIPTION OF THE INVENTION

It was surprisingly discovered that aqueous crude oil treatment compositions, such as reverse emulsion breakers, may be formulated into organic surfactants, such as primary emulsion breakers and aromatic solvents. These dual aqueous phase and oil phase compositions, or "dual phase compositions" allow the combination of aqueous-based and oil-based crude-oil additives into a single product. The single product may be placed in a single drum which saves transportation costs and reduces the number of pumps, feed lines, and crude oil additives. Surprisingly, these dual phase compositions are stable as the oil phase does not separate from the aqueous phase.

Accordingly, dual phase compositions for treating a hydrocarbon stream are disclosed, wherein the dual phase compositions comprise an aqueous phase and an oil phase that form a colloidal micellar solution. In another embodiment, the hydrocarbon stream comprises crude oil.

In another embodiment, the dual phase composition may further comprise one or more aqueous or oil-based crude oil treatments or additives. In one embodiment, the dual phase composition comprises one or more inorganic flocculants or coagulants, such as hydrated chlorides and sulfates.

In yet another embodiment, the dual phase composition may further comprise a water-soluble or oil-soluble corrosion inhibitor. The corrosion inhibitor may comprise at least one imidazoline such as hydroxyethyl imidazoline, aminoethyl imidazoline, and amidoethyl imidazoline.

In another embodiment, the oil phase may comprise a primary emulsion breaker. The primary emulsion breaker may comprise a mixture of 1) a $C_4$-$C_{12}$ alkyl phenol-formaldehyde resin alkoxylate and 2) an oil-soluble surfactant.

The oil-soluble surfactant may be a polyalkylene oxide triblock polyol that is less than about 50% ethylene oxide by weight and has an average molecular weight, $\overline{M}w$, of less than about 6,000 g/mol. In another embodiment, the oil-soluble surfactant may have the formula I:

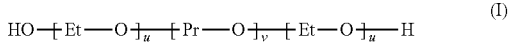

(I)

wherein Et is ethylene and Pr is propylene and each u=20 moles, v=40 moles, and wherein $\overline{M}w$ is about 4,200 g/mol.

In yet another embodiment of the oil phase, 1) may be present in an amount of about 90-50% by weight based upon a combined weight of 1) and 2), and the oil-soluble surfactant 2) may be present in an amount of about 10-50% by weight based upon a combined weight of 1) and 2). In yet another embodiment, the $C_4$-$C_{12}$ alkyl phenol-formaldehyde resin alkoxylate may be amylphenol formaldehyde resin alkoxylate with an approximate degree of ethoxylation of 40%.

The oil phase may also comprise at least one non-polar organic solvent. Suitable non-polar organic solvents include, but are not limited to, naphtha, heavy aromatic naphtha, pentane, cyclopentane, hexane, cyclohexane, benzene, ethyl benzene, 1,2,4-trimethyl benzene, toluene, xylene, cumene, 1,4-dioxane, chloroform, diethyl ether, and methyl esters of fatty acids (biodiesel). In another embodiment, the oil phase may further comprise hexylene glycol.

In another embodiment, the weight percent of the oil phase may range from about 70 wt % to about 99 wt % of the total weight of the dual phase composition. Alternatively, the oil phase may range from about 85 wt % to about 95 wt %.

In other embodiments, the aqueous phase may comprise and acid or base pH adjuster. In one embodiment the base may be a hydroxide base such as sodium or potassium hydroxide. In another embodiment, the pH adjuster may be an organic acid, mineral acid, or a carboxylic acid, such as citric acid.

In another embodiment, the aqueous phase may comprise a water-soluble surfactant. The water-soluble surfactant may be a polyalkylene oxide triblock polyol that is greater than about 50% ethylene oxide by weight. In another embodiment, the water-soluble surfactant may have the formula II:

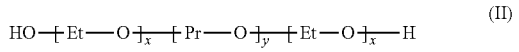

(II)

wherein Et is ethylene and Pr is propylene and each x=76 moles, y=32 moles, and wherein $\overline{M}w$ is about 8,400 g/mol.

In yet other embodiments, aqueous phase may comprise one or more wetting agents like sulfonates such as dioctyl sulfosuccinate.

In yet another embodiment, the aqueous phase may comprise a reverse emulsion breaker. The reverse emulsion breaker may be a mixture comprising 1) aluminum chlorohydrate and 2) poly(diallyldimethylammonium chloride) having a molecular weight of about 100,000. The weight ratio of 1) to 2) may range from about 3:1 to about 15:1. In another embodiment, the weight ratio may be about 9:1.

In other embodiments, methods for reducing an emulsion in a hydrocarbon stream are also disclosed. The methods comprise providing a hydrocarbon stream; providing a dual phase composition comprising an oil phase and an aqueous phase; contacting the hydrocarbon stream with the dual phase composition; coalescing aqueous droplets from the emulsion and the aqueous phase to form a water stream; and removing the water stream. The dual phase composition may be a colloidal micellar solution formed by the oil and aqueous phases. The hydrocarbon stream may comprise crude oil. The emulsion may be reduced in a desalter in a crude oil refinery.

In another method, the dual phase composition may further comprise one or more aqueous or oil-based crude oil treatments or additives. In one embodiment, the dual phase composition comprises one or more inorganic flocculants or coagulants, such as hydrated chlorides and sulfates.

In yet another method, the dual phase composition may further comprise a water-soluble or oil-soluble corrosion inhibitor. The corrosion inhibitor may comprise at least one imidazoline such as hydroxyethyl imidazoline, aminoethyl imidazoline, and amidoethyl imidazoline.

In another method, the oil phase may comprise a primary emulsion breaker. Suitable primary emulsion breakers comprise one or more alkoxylated alkylphenol resins or alkoxylated phenolformaldehyde resins. These phenolic resins typically have low molecular weights on the order of about 1,000 to about 5,000 $\overline{M}w$ with a degree of ethoxylation ranging from about 40 mol % to about 60 mol %.

In another method embodiment, the primary emulsion breaker may comprise a mixture of 1) a $C_4$-$C_{12}$ alkyl phenol-formaldehyde resin alkoxylate and 2) an oil-soluble surfactant.

The oil-soluble surfactant may be a polyalkylene oxide triblock polyol that is less than about 50% ethylene oxide by weight and has an average molecular weight, $\overline{M}w$, of less than about 6,000 g/mol. In another embodiment, the oil-soluble surfactant may have the formula I:

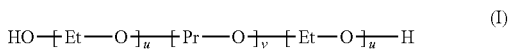

(I)

wherein Et is ethylene and Pr is propylene and each u=20 moles, v=40 moles, and wherein $\overline{M}w$ is about 4,200.

In yet another embodiment, 1) may be present in an amount of about 90-50% by weight based upon a combined weight of 1) and 2) and the oil-soluble surfactant 2) may be present in an amount of about 10-50% by weight based upon a combined weight of 1) and 2). In yet another embodiment, the $C_4$-$C_{12}$ alkyl phenol-formaldehyde resin alkoxylate may be amylphenol formaldehyde resin alkoxylate with an approximate degree of ethoxylation of 40%.

The oil phase may also comprise at least one non-polar organic solvent. Suitable non-polar organic solvents include, but are not limited to, naphtha, heavy aromatic naphtha, pentane, cyclopentane, hexane, cyclohexane, benzene, ethyl benzene, 1,2,4-trimethyl benzene, toluene, xylene, cumene, 1,4-dioxane, chloroform, diethyl ether, and methyl esters of fatty acids (biodiesel). In another embodiment, the oil phase may further comprise hexylene glycol.

In another embodiment, the weight percent of the oil phase may range from about 70 wt % to about 99 wt % of the total weight of the dual phase composition. Alternatively, the oil phase may range from about 85 wt % to about 95 wt %.

In other method embodiments, the aqueous phase may comprise and acid or base pH adjuster. In one embodiment the base may be a hydroxide base such as sodium or potassium hydroxide. In another embodiment, the pH adjuster may be an organic acid, mineral acid, or a carboxylic acid, such as citric acid.

In another method embodiment, the aqueous phase may comprise a water-soluble surfactant. The water-soluble surfactant may be polyalkylene oxide triblock polyol that is greater than about 50% ethylene oxide by weight. In another embodiment, the water-soluble surfactant may have the formula II:

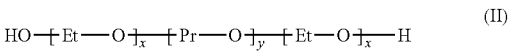

(II)

wherein Et is ethylene and Pr is propylene and each x=76 moles, y=32 moles, and wherein $\overline{M}w$ is about 8,400 g/mol.

In yet other method embodiments, the aqueous phase may comprise one or more wetting agents like sulfonates.

In yet another method, the aqueous phase may comprise a reverse emulsion breaker mixture comprising 1) aluminum chlorohydrate and 2) poly(diallyldimethylammonium chloride) having a molecular weight of about 100,000. The weight ratio of 1) to 2) may range from about 3:1 to about 15:1. In another embodiment, the weight ratio may be about 9:1.

In another method, the dual phase composition may be added to the hydrocarbon stream in an amount ranging from about 1 to about 200 ppm by volume of the hydrocarbon stream. In yet another method, the dual phase composition may added in an amount ranging from about 1 to about 30 ppm of the hydrocarbon stream.

DETAILED DESCRIPTION OF EXEMPLARY EMBODIMENTS

It was surprisingly discovered that aqueous crude oil treatment compositions, such as reverse emulsion breakers, may be formulated into organic surfactants, such as primary emulsion breakers, and aromatic solvents. These dual aqueous phase and oil phase compositions, or "dual phase compositions" allow the combination of aqueous-based and oil-based crude-oil additives into a single product. The single product may be placed in a single drum which saves transportation costs and reduces the number of pumps, feed lines, and crude oil additives. Surprisingly, these dual phase compositions are stable as the oil phase does not separate from the aqueous phase.

Without limiting this specification to one theory of operation, it is thought that the dual phase compositions are stable because the primary emulsion breakers present therein contain oil-based ethoxylated surfactants that are colloidal solutions and not true solutions as previously thought.

The colloidal solutions contain micelles. Micelles are groups of surfactant molecules dispersed in a liquid forming a colloidal solution. Typically, micelles are spherical with the hydrophilic portion of the surfactant molecules forming the outside of the micelle and the hydrophobic portion filling the micelle's interior. Based upon factors such as concentration and temperature as well as the surfactant's chemical structure, other shapes are possible such as rods, tubes, or sheets.

The micelles only form when the concentration of the surfactant in the liquid is greater than the critical micelle concentration ("CMC"). The CMC may vary depending on the surfactant and the liquid used. Other factors that affect the CMC are temperature, pressure, and the presence of any other compounds that affect the surface tension of the liquid. Generally, the CMC of the dual compositions of the present invention is reached when the concentration of the oil-soluble surfactant ranges from about 0.02 to about 0.5 wt % based on a total weight of the dual composition. This corresponds to a concentration of the oil-soluble surfactant in the oil phase ranging from about 5 to about 40 wt % of a total weight of the oil phase Primary emulsion breakers typically have multiple components, including, but not limited to, one or more ethoxylated surfactants in an organic solvent, or "oil", like naphtha or toluene. An "oil" is any liquid that is soluble in another oil or organic solvent, but is not soluble in water. Thus the micelles in primary emulsion breakers are "inverse" micelles because the hydrophobic portion of the surfactant forms the outside of the micelle, and the hydrophilic portion fills the interior. It is thought that when added to primary emulsion breakers, aqueous solutions such as reverse emulsion breakers, enter into the interior of the micelles and "hydrate" the hydrophilic, or polar portion, of the ethylene oxide molecules.

Accordingly, dual phase compositions for treating a hydrocarbon stream are disclosed, wherein the dual phase compositions comprise an aqueous phase and an oil phase that form a colloidal micellar solution. In another embodiment, the hydrocarbon stream comprises crude oil.

In another embodiment, the dual phase composition may further comprise one or more aqueous or oil-based crude oil treatments or additives. In one embodiment, the dual phase composition comprises one or more inorganic flocculants or coagulants, such as hydrated chlorides and sulfates. Suitable hydrated chlorides include, but are not limited to, aluminum chloride, aluminum chlorohydrate, iron chloride, and zinc chloride. Suitable sulfates include, but are not limited to, aluminum sulfate, and iron sulfate.

In yet another embodiment, the dual phase composition may further comprise a water-soluble or oil-soluble corrosion inhibitor. The corrosion inhibitor may comprise at least one imidazoline such as hydroxyethyl imidazoline, aminoethyl imidazoline, and amidoethyl imidazoline.

In another embodiment, the oil phase may comprise a primary emulsion breaker. Suitable primary emulsion breakers comprise one or more alkoxylated alkylphenol resins or alkoxylated phenolformaldehyde resins. These phenolic resins typically have low molecular weights on the order of about 1,000 to about 5,000 $\overline{M}w$ with a degree of ethoxylation ranging from about 40 mol % to about 60 mol %.

In another embodiment, the primary emulsion breaker may comprise a mixture of 1) a $C_4$-$C_{12}$ alkyl phenol-formaldehyde resin alkoxylate and 2) an oil-soluble surfactant. In yet another embodiment, the $C_4$-$C_{12}$ alkyl phenol-formaldehyde resin alkoxylate may be amylphenol formaldehyde resin alkoxylate with an approximate degree of ethoxylation of 40%.

The oil-soluble surfactant may be a polyalkylene oxide triblock polyol that is less than about 50% ethylene oxide by weight and has an average molecular weight, $\overline{M}w$, of less than about 6,000 g/mol. In another embodiment, the oil-soluble surfactant may have the formula I:

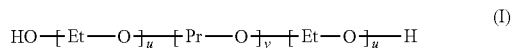

$$HO\text{---}(Et\text{---}O)_u\text{---}(Pr\text{---}O)_v\text{---}(Et\text{---}O)_u\text{---}H \quad (I)$$

wherein Et is ethylene and Pr is propylene and each u=20 moles, v=40 moles, and wherein $\overline{M}w$ is about 4,200.

In yet another embodiment, 1) may be present in an amount of about 90-50% by weight based upon a combined weight of 1) and 2) and the oil-soluble surfactant 2) may be present in an amount of about 10-50% by weight based upon a combined weight of 1) and 2).

The oil-soluble surfactant may be present above the critical micelle concentration (CMC) to encourage micelle formation. Accordingly, the concentration of the oil-soluble surfactant in the oil phase may range from about 5 to about 40 wt % of a total weight of the oil phase.

The oil phase may also comprise at least one non-polar organic solvent. Suitable non-polar organic solvents include, but are not limited to, naphtha, heavy aromatic naphtha, pentane, cyclopentane, hexane, cyclohexane, benzene, ethyl benzene, 1,2,4-trimethyl benzene, toluene, xylene, cumene, 1,4-dioxane, chloroform, diethyl ether, and methyl esters of fatty acids (biodiesel). In another embodiment, the oil phase may further comprise hexylene glycol.

In another embodiment, the weight percent of the oil phase may range from about 70 wt % to about 99 wt % of the total weight of the dual phase composition. Alternatively, the oil phase may range from about 85 wt % to about 95 wt %. Accordingly, the aqueous phase may range from about 30 wt % to about 1 wt % of the total weight of the dual phase composition. In another embodiment, the aqueous phase may range from about 15 wt % to about 5 wt %.

The aqueous phase may comprise one or more components, including, but not limited to a water-soluble surfactant, a pH adjuster, a flocculant, a wetting agent, a metal complexing agent, a reverse emulsion breaker, or a corrosion inhibitor.

In other embodiments, the aqueous phase may comprise an acid or base pH adjuster. Suitable bases may be hydroxide bases of Group 1A and IIA metals. In one embodiment the hydroxide base may be sodium or potassium hydroxide. In another embodiment, the pH adjuster may be an organic acid, mineral acid, or a carboxylic acid. Examples of suitable acids include, citric acid, propane-1,2,3-tricarboxylic acid, glycolic acid, formic acid, acetic acid, propanoic acid, butanoic acid, pentanoic acid, oxalic acid, glutaric acid, succinic acid, malonic acid, ascorbic acid, and lactic acid. Citric acid has the added advantage in that is also a metal complexing agent and may reduce the amount of metals in the stream being treated.

In one embodiment, the aqueous phase may comprise a water-soluble surfactant. The water-soluble surfactant may be polyalkylene oxide triblock polyol that is greater than about 50% ethylene oxide by weight. In another embodiment, the water-soluble surfactant may have the formula II:

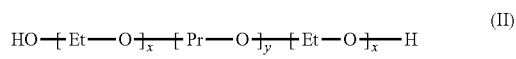
(II)

wherein Et is ethylene and Pr is propylene and each x=76 moles, y=32 moles, and wherein $\overline{M}w$ is about 8,400 g/mol.

In another embodiment, the aqueous phase may comprise one or more wetting agents like sulfonates. Suitable sulfonates include, but are not limited to, sodium dioctyl sulfosuccinate and sodium dodecylbenzene sulfonate.

In another embodiment, the aqueous phase may comprise a reverse emulsion breaker. The reverse emulsion breaker may comprise at least one water-soluble polymer selected from the group consisting of polyamines and dialkyl diallyl ammonium polymers.

In one embodiment, the reverse emulsion breaker may comprise one or more water-soluble polyamines that includes the structure as in formula III:

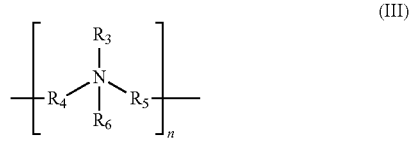
(III)

where $R_3$, $R_4$, and $R_5$ may the same or different and are H, or alkyls of 1 to 20 carbon atoms; where $R_6$ may or may not be present and is H, or an alkyl of 1 to 20 carbon atoms; and where n ranges from 2 to 50,000. The alkyls may be straight alkyls, branched alkyls, cycloalkyl rings (aryls), hydroxyl-substituted alkyls, or alkoxy-substituted alkyls.

Suitable water-soluble polyamines include, but are not limited to dimethylamine, dimethylpropylamine, dimethylaminopropylamine, 1,4-dimethylpiperazine, N-methylpyrrolidine, di-ethylhydroxylamine, pyrrolidine, dimethyl-N-propylamine, N,N,N,N-tetramethylethylenediamine, di-ethylenetriamine and furfurylamine.

In another embodiment, the polyamine may further comprise a quaternary ammonium group. Suitable quaternary ammonium containing polyamines include, but are not limited to, acryloxyethyltrimethlammonium chloride, methacrylamidopropyltrimethylammonium chloride, methacryloxyethyltrimethylammonium chloride, di-alkyldimethylammonium chloride.

In another embodiment, the reverse emulsion breaker may comprise one or more water-soluble di $C_1$-$C_8$ dialkyl diallyl ammonium polymers. Suitable dialkyl diallyl ammonium polymers include, but are not limited to, polydimethyl diallyl ammonium chloride, polydi-ethyldiallyl ammonium chloride, polydimethdyl diallyl ammonium bromide, polydi-ethyl diallyl ammonium bromide. In another embodiment, the reverse emulsion breaker comprises dimethyl diallyl ammonium chloride.

In another embodiment, the reverse emulsion breaker may comprise an ethylenediamine ethylene oxide/propylene oxide block copolymer as in formula IV:

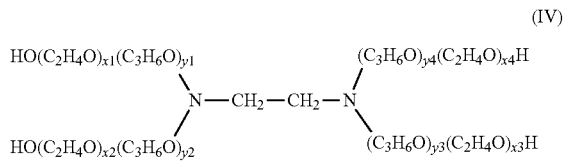
(IV)

where x1, x2, x3, and x4 may be the same or different and represent the number of poly(ethylene oxide) units and where y1, y2, y3, and y4 may be the same or different and represent the number of poly(propylene oxide) units. The ratio of the poly(ethylene oxide) units to poly propylene oxide) units may be about 30:70. Examples of ethylenediamine ethylene oxide/propylene oxide block copolymers are the Tetronic® surfactants from BASF.

In yet another embodiment, the reverse emulsion breaker may be a mixture comprising 1) aluminum chlorohydrate and 2) poly(diallyldimethylammonium chloride) having a molecular weight of about 100,000. The weight ratio of 1) to 2) may range from about 3:1 to about 15:1. In another embodiment, the weight ratio may be about 9:1.

In other embodiments, methods for reducing an emulsion in a hydrocarbon stream are also disclosed. The methods comprise providing a hydrocarbon stream; providing a dual phase composition comprising an oil phase and an aqueous phase; contacting the hydrocarbon stream with the dual phase composition; coalescing aqueous droplets from the emulsion and the aqueous phase to form a water stream; and removing the water stream. The dual phase composition may be colloidal micellar solution formed by the oil and aqueous phases. The hydrocarbon stream may comprise crude oil. The emulsion may be reduced in a desalter in a crude oil refinery.

In another method, the dual phase composition used may further comprise one or more aqueous or oil-based crude oil treatments or additives. In one embodiment, the dual phase composition comprises one or more inorganic flocculants or coagulants, such as hydrated chlorides and sulfates. Suitable hydrated chlorides include, but are not limited to, aluminum chloride, aluminum chlorohydrate, iron chloride, and zinc chloride. Suitable sulfates include, but are not limited to, aluminum sulfate, and iron sulfate.

In yet another method, the dual phase composition used may comprise a water-soluble or oil-soluble corrosion inhibitor. The corrosion inhibitor may comprise at least one imidazoline such as hydroxyethyl imidazoline, aminoethyl imidazoline, and amidoethyl imidazoline.

In another method, the oil phase may comprise a primary emulsion breaker. Suitable primary emulsion breakers comprise one or more alkoxylated alkylphenol resins or alkoxylated phenolformaldehyde resins. These phenolic resins typically have low molecular weights on the order of about 1,000 to about 5,000 $\overline{M}w$ with a degree of ethoxylation ranging from about 40 mol % to about 60 mol %.

In another method embodiment, the primary emulsion breaker may comprise a mixture of 1) a $C_4$-$C_{12}$ alkyl phenolformaldehyde resin alkoxylate and 2) an oil-soluble surfactant.

The oil-soluble surfactant may be a polyalkylene oxide triblock polyol that is less than about 50% ethylene oxide by weight and has an average molecular weight, $\overline{M}w$, of less than about 6,000 g/mol. In another embodiment, the oil-soluble surfactant may have the formula I:

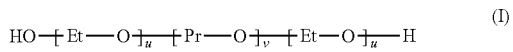

wherein Et is ethylene and Pr is propylene and each u=20 moles, v=40 moles, and wherein $\overline{M}w$ is about 4,200.

In yet another embodiment, 1) may be present in an amount of about 90-50% by weight based upon a combined weight of 1) and 2) and the oil-soluble surfactant 2) may be present in an amount of about 10-50% by weight based upon a combined weight of 1) and 2). In yet another embodiment, the $C_4$-$C_{12}$ alkyl phenol-formaldehyde resin alkoxylate may be amylphenol formaldehyde resin alkoxylate with an approximate degree of ethoxylation of 40%.

The oil phase may also comprise at least one non-polar organic solvent. Suitable non-polar organic solvents include, but are not limited to, naphtha, heavy aromatic naphtha, pentane, cyclopentane, hexane, cyclohexane, benzene, ethyl benzene, 1,2,4-trimethyl benzene, toluene, xylene, cumene, 1,4-dioxane, chloroform, diethyl ether, and methyl esters of fatty acids (biodiesel). In another embodiment, the oil phase may further comprise hexylene glycol.

In another embodiment, the weight percent of the oil phase may range from about 70 wt % to about 99 wt % of the total weight of the dual phase composition. Alternatively, the oil phase may range from about 85 wt % to about 95 wt %. Accordingly, the aqueous phase may range from about 30 wt % to about 1 wt % of the total weight of the dual phase composition. In another embodiment, the aqueous phase may range from about 15 wt % to about 5 wt %.

The aqueous phase may comprise one or more components, including, but not limited to a water-soluble surfactant, a pH adjuster, a flocculant, a wetting agent, a metal complexing agent, a reverse emulsion breaker, or a corrosion inhibitor.

In other method embodiments, the aqueous phase may comprise and acid or base pH adjuster. Suitable bases may be hydroxide bases of Group 1A and IIA metals. In one embodiment the hydroxide base may be sodium or potassium hydroxide. In another embodiment, the pH adjuster may be an organic acid, mineral acid, or a carboxylic acid. Examples of suitable acids include, citric acid, propane-1,2,3-tricarboxylic acid, glycolic acid, formic acid, acetic acid, propanoic acid, butanoic acid, pentanoic acid, oxalic acid, glutaric acid, succinic acid, malonic acid, ascorbic acid, and lactic acid. Citric acid has the added advantage in that is also a metal complexing agent, and may reduce the amount of metals in the stream being treated.

In one embodiment, the aqueous phase may comprise a water-soluble surfactant. The water-soluble surfactant may be a polyalkylene oxide triblock polyol that is greater than about 50% ethylene oxide by weight. In another embodiment, the water-soluble surfactant may have the formula II:

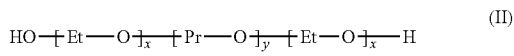

wherein Et is ethylene and Pr is propylene and each x=76 moles, y=32 moles, and wherein $\overline{M}w$ is about 8,400 g/mol.

In yet other method embodiments, the aqueous phase may comprise one or more wetting agents like sulfonates. Suitable sulfonates include, but are not limited to, sodium dioctyl sulfosuccinate and sodium dodecylbenzene sulfonate.

In yet another method, the aqueous phase may comprise a reverse emulsion breaker may be a mixture comprising 1) aluminum chlorohydrate and 2) poly(diallyldimethylammonium chloride) having a molecular weight of about 100,000. The weight ratio of 1) to 2) may range from about 3:1 to about 15:1. In another embodiment, the weight ratio may be about 9:1.

The amount of the dual phase composition used will vary with refineries and the amount of emulsification present in the hydrocarbon stream. In one method, the dual phase composition may be added to the hydrocarbon stream in an amount ranging from about 1 to about 200 ppm by volume of the hydrocarbon stream. In yet another method, the dual phase composition may be added in an amount ranging from about 1 to about 30 ppm of the hydrocarbon stream.

EXAMPLES

For the following examples, Examples 1-5, 10 wt % of an aqueous phase and 90 wt % of an oil phase were mixed to form a dual phase composition. Table 1 lists an exemplary formulation for the oil phase. The weight percents listed in Table 1 are based on the total weight of the oil phase. The various aqueous phases for the examples comprised 10 wt % of the total weight of the dual phase composition and are listed in Table 2.

TABLE 1

| Oil Phase (90 wt % of total) |
| --- |
| 22.22 wt % amylphenol formaldehyde resin alkoxylate |
| 13.33 wt % oil-soluble EtO/PrO surfactant |
| 53.33 wt % naphtha and heavy aromatic solvent blend |
| 11.11 wt % hexylene glycol |

The oil phase was then combined with the aqueous phase to form a dual phase composition. The aqueous phases were aqueous solutions formulated as in Table 2.

TABLE 2

| Example | Various Aqueous Phases (10 wt % of total) |
| --- | --- |
| 1 | 1 wt % NaOH solution |
| 2 | 10 wt % water-soluble EtO/PrO surfactant |
| 3 | 10 wt % citric acid solution |
| 4 | 10 wt % sodium dioctyl sulfosuccinate |
| 5 | 47 wt % aluminum chlorohydrate and poly(diallyldimethylammonium chloride) mixture |

As listed in Tables 1 and 2, an exemplary dual phase composition, Example 1, comprised 20 wt % amylphenol formaldehyde resin alkoxylate, 12 wt % of an oil-soluble ethylene oxide/propylene oxide surfactant, 48 wt % of a non-polar organic solvent, 10 wt % hexylene glycol, and 10 wt % of a 1 wt % NaOH solution. These wt % values are based on a total wt % of the dual composition. Exemplary dual phase composition Example 2 comprised 20 wt % amylphenol formaldehyde resin alkoxylate, 12 wt % of an oil-soluble ethylene oxide/propylene oxide surfactant, 48 wt % of a non-polar organic solvent, 10 wt % hexylene glycol, and 10 wt % of a water-soluble ethylene oxide/propylene oxide surfactant. Example 3 comprised 20 wt % amylphenol formaldehyde resin alkoxylate, 12 wt % of an oil-soluble ethylene oxide/propylene oxide surfactant, 48 wt % of a non-polar organic solvent, 10 wt % hexylene glycol, and 10 wt % of a citric acid solution. Example 4 comprised 20 wt % amylphenol formaldehyde resin alkoxylate, 12 wt % of an oil-soluble ethylene oxide/propylene oxide surfactant, 48 wt % of a non-polar organic solvent, 10 wt % hexylene glycol, and 10 wt % sodium dioctyl sulfosuccinate. Example 5 comprised 20 wt % amylphenol formaldehyde resin alkoxylate, 12 wt % of an oil-soluble ethylene oxide/propylene oxide surfactant, 48 wt % of a non-polar organic solvent, 10 wt % hexylene glycol, and 10 wt % of a 47 wt % aluminum chlorohydrate and poly(diallyldimethylammonium chloride) mixture.

The resulting dual phase compositions, Examples 1 through 5, were stable, homogenous mixtures and did not separate when stored at ambient temperature or at −10° C. for more than 14 days.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Those skilled in the art will recognize that the dual phase compositions have multiple applications, including but not limited to, oil-field or "downhole" applications or in crude oil refining applications. For example, the same methods may be used to incorporate water soluble corrosion inhibitors into organic solutions of demulsifiers which are used in the geological formation producing the oil. Such other examples are intended to be within the scope of the claims if they have structural elements that do not differ from the literal language of the claims, or if they include equivalent structural elements with insubstantial differences from the literal languages of the claims.

What is claimed is:

1. A dual phase composition for treating a hydrocarbon stream, said dual phase composition comprising an oil phase and an aqueous phase, said oil phase comprising a primary emulsion breaker, said primary emulsion breaker comprising: 1) a $C_4$-$C_{12}$ alkyl phenol-formaldehyde resin alkoxylate and 2) an oil-soluble surfactant, wherein said oil-soluble surfactant is a polyalkylene oxide triblock polyol that is less than about 50% ethylene oxide by weight and has an average molecular weight, $\overline{M}w$, less than about 6,000 g/mol, wherein 1) is present in an amount of about 90-50% by weight based upon a combined weight of 1) and 2) and said oil-soluble surfactant 2) is present in an amount of about 10-50% by weight based upon a combined weight of 1) and 2), said oil soluble surfactant 2) also present in an amount of 5-40% by weight based upon the weight of said oil phase and wherein the weight percentage of said oil phase in said dual phase composition ranges from about 70 wt % to about 99 wt %, wherein said oil phase and said aqueous phase form a colloidal inverse micellar solution.

2. The dual phase composition of claim 1, wherein said hydrocarbon stream comprises crude oil.

3. The dual phase composition of claim 1, wherein said oil-soluble surfactant is a polyalkylene oxide triblock polyol having the formula:

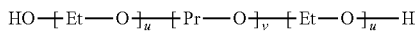

wherein Et is ethylene and Pr is propylene and each u=20 moles, v=40 moles, and wherein $\overline{M}w$ is about 4,200.

4. The dual phase composition of claim 1, wherein said $C_4$-$C_{12}$ alkyl phenol-formaldehyde resin alkoxylate is amylphenol formaldehyde resin alkoxylate.

5. The dual phase composition of claim 1, wherein said oil phase comprises at least one non-polar organic solvent.

6. The dual phase composition of claim 5, wherein at least one non-polar organic solvent is selected from the group consisting of naphtha, heavy aromatic naphtha, pentane, cyclopentane, hexane, cyclohexane, benzene, ethyl benzene, 1,2,4-trimethyl benzene, toluene, xylene, cumene, 1,4-dioxane, chloroform, diethyl ether, and methyl esters of fatty acids (biodiesel).

7. The dual phase composition of claim 1, wherein said oil phase further comprises hexylene glycol.

8. The dual phase composition of claim 1, wherein a weight percent of said oil phase in said dual composition ranges from about 85 wt % to about 95 wt %.

9. The dual phase composition of claim 1, wherein said aqueous phase comprises a water-soluble pH adjusting agent.

10. The dual phase composition of claim 9, wherein said water-soluble pH adjusting agent is a base selected from the group consisting of sodium hydroxide and potassium hydroxide.

11. The dual phase composition of claim 9, wherein said water-soluble pH adjusting agent is citric acid.

12. The dual phase composition of claim 1 wherein said aqueous phase comprises a water-soluble surfactant, wherein said water-soluble surfactant is a polyalkylene oxide triblock polyol having the formula:

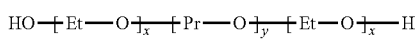

wherein Et is ethylene and Pr is propylene and each x=76 moles, y=32 moles, and wherein $\overline{M}w$ is about 8,400 g/mol.

13. The dual phase composition of claim 1, wherein said aqueous phase comprises a wetting agent.

14. The dual phase composition of claim 13, wherein said wetting agent is sodium dioctyl sulfosuccinate.

15. The dual phase composition of claim 1, wherein said aqueous phase comprises a reverse emulsion breaker, said reverse emulsion breaker comprising: 1) aluminum chlorohydrate and 2) poly(diallyldimethylammonium chloride) having a molecular weight of about 100,000, wherein a weight ratio of 1) to 2) ranges from about 3:1 to about 15:1.

16. The dual phase composition of claim 15, wherein a weight ratio of 1) aluminum chlorohydrate to 2) poly(diallyldimethylammonium chloride) is about 9:1.

17. The dual phase composition of claim 1, wherein said dual phase composition further comprises a water-soluble or oil-soluble corrosion inhibitor.

18. The dual phase composition of claim 17, wherein said corrosion inhibitor comprises at least one imidazoline selected from the group consisting of hydroxyethyl imidazolines, aminoethyl imidazolines, and amidoethyl imidazolines.

19. Dual phase composition as recited in claim 1 wherein said colloidal inverse micellar solution is disposed in a single drum as a stable composition without separation of the oil phase from the aqueous phase.

20. A method of reducing an emulsion present in a hydrocarbon stream comprising:
   (a) providing said hydrocarbon stream;
   (b) providing a dual phase composition, said dual phase composition comprising an oil phase and an aqueous phase, said oil phase comprising a primary emulsion breaker, said primary emulsion breaker comprising: 1) a $C_4$-$C_{12}$ alkyl phenol-formaldehyde resin alkoxylate and 2) an oil-soluble surfactant, wherein said oil-soluble surfactant is a polyalkylene oxide triblock polyol that is less than about 50% ethylene oxide by weight and has an average molecular weight, $\overline{Mw}$, less than about 6,000 g/mol, wherein 1) is present in an amount of about 90-50% by weight based upon a combined weight of 1) and 2) and said oil-soluble surfactant 2) is present in an amount of about 10-50% by weight based upon a combined weight of 1) and 2), said oil soluble surfactant 2) also present in an amount of 5-40% by weight based upon the weight of said oil phase and wherein the weight percentage of said oil phase in said dual phase composition ranges from about 70 wt % to about 99 wt %, wherein said oil phase and said aqueous phase form a colloidal inverse micellar solution;
   (c) contacting said hydrocarbon stream with said dual phase composition;
   (d) coalescing aqueous droplets from said emulsion and said aqueous phase to form a water stream; and
   (e) removing said water stream.

21. The method of claim 20, wherein said hydrocarbon stream comprises crude oil.

22. The method of claim 20, wherein said reduction of said emulsion is performed in a desalter.

23. The method of claim 20, wherein said oil-soluble surfactant is a polyalkylene oxide triblock polyol having the formula:

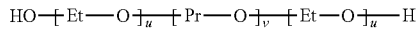

wherein Et is ethylene and Pr is propylene and each u=20 moles, v=40 moles, and wherein $\overline{Mw}$ is about 4,200.

24. The method of claim 20, wherein said $C_4$-$C_{12}$ alkyl phenol-formaldehyde resin alkoxylate is amylphenol formaldehyde resin alkoxylate.

25. The method of claim 20, wherein said oil phase comprises at least one non-polar organic solvent.

26. The method of claim 25, wherein at least one non-polar organic solvent is selected from the group consisting of naphtha, heavy aromatic naphtha, pentane, cyclopentane, hexane, cyclohexane, benzene, ethyl benzene, 1,2,4-trimethyl benzene, toluene, xylene, cumene, 1,4-dioxane, chloroform, diethyl ether, and methyl esters of fatty acids (biodiesel).

27. The method of claim 20, wherein said oil phase comprises hexylene glycol.

28. The method of claim 20, wherein a weight percent of said oil phase in said dual composition ranges from about 85 wt % to about 95 wt %.

29. The method of claim 20, wherein said aqueous phase comprises a water-soluble pH adjusting agent.

30. The method of claim 29, wherein said water-soluble pH adjusting agent is a base selected from the group consisting of sodium hydroxide and potassium hydroxide.

31. The method of claim 29, wherein said water-soluble pH adjusting agent is citric acid.

32. The method of claim 20, wherein said aqueous phase comprises a water-soluble polyalkylene oxide triblock polyol surfactant, said water-soluble surfactant having the formula:

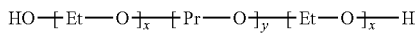

wherein Et is ethylene and Pr is propylene and each x=76 moles, y=32 moles, and wherein $\overline{Mw}$ is about 8,400 g/mol.

33. The method of claim 20, wherein said aqueous phase comprises a wetting agent.

34. The method of claim 33, wherein said wetting agent is sodium dioctyl sulfosuccinate.

35. The method of claim 20, wherein said aqueous phase comprises a reverse emulsion breaker, said reverse emulsion breaker comprising: 1) aluminum chlorohydrate and 2) poly (diallyldimethylammonium chloride) having a molecular weight of about 100,000, and wherein a weight ratio of 1) to 2) ranges from about 3:1 to about 15:1.

36. The method of claim 35, wherein a weight ratio of 1) aluminum chlorohydrate to 2) poly(diallyldimethylammonium chloride) is about 9:1.

37. The method of claim 20, wherein said dual phase composition further comprises an oil-soluble or water-soluble corrosion inhibitor.

38. The method of claim 37, wherein said corrosion inhibitor comprises at least one imidazoline selected from the group consisting of hydroxyethyl imidazolines, aminoethyl imidazolines, and amidoethyl imidazolines.

39. The method of claim 20, wherein said dual phase composition is added to said hydrocarbon stream in an amount ranging from about 1 to about 200 ppm by volume of said hydrocarbon stream.

40. The method of claim 39, wherein said dual phase composition is added to said hydrocarbon stream in an amount ranging from about 1 to about 30 ppm by volume of said hydrocarbon stream.

* * * * *